(12) United States Patent
Liang et al.

(10) Patent No.: US 11,710,822 B2
(45) Date of Patent: *Jul. 25, 2023

(54) COMPOSITE GRAPHITE MATERIAL, SECONDARY BATTERY, APPARATUS AND PREPARATION METHOD THEREOF

(71) Applicant: Contemporary Amperex Technology Co., Limited, Ningde (CN)

(72) Inventors: Chengdu Liang, Ningde (CN); Yuzhen Zhao, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,400

(22) Filed: May 25, 2021

(65) Prior Publication Data

US 2021/0280857 A1    Sep. 9, 2021

Related U.S. Application Data

(63) Continuation of application No. PCT/CN2019/122712, filed on Dec. 3, 2019.

(51) Int. Cl.
*H01M 4/36* (2006.01)
*C01B 32/21* (2017.01)
(Continued)

(52) U.S. Cl.
CPC ............. *H01M 4/366* (2013.01); *C01B 32/21* (2017.08); *H01M 4/587* (2013.01); *H01M 4/60* (2013.01);
(Continued)

(58) Field of Classification Search
CPC ........ H01M 4/366; H01M 4/587; H01M 4/60; H01M 4/622; H01M 10/0525;
(Continued)

(56) References Cited

U.S. PATENT DOCUMENTS 9,643,894 B2    5/2017    Yano et al.

FOREIGN PATENT DOCUMENTS

| CN | 106797026 A | 5/2017 |
| CN | 109997256 A | 7/2019 |

(Continued)

OTHER PUBLICATIONS

The extended European search report for EP Application No. 19952949.6, dated Nov. 2, 2021, 10 pages.
Database WPI Week 201876 Thomson Scientific, London, GB;AN 2018-856597 XP002804565.
The First Examination Report for EP Application No. 19952949.6, dated Apr. 13, 2022, 7 pages.
(Continued)

*Primary Examiner* — Andrew J. Oyer
(74) *Attorney, Agent, or Firm* — East IP P.C.

(57) ABSTRACT

The present application discloses a composite graphite material, a secondary battery, an apparatus and a preparation method thereof. The composite graphite material includes a core material and a coating layer coating at least a part of the surface of the core material, the core material including graphite; wherein the absolute value K of zeta potential of the composite graphite material in deionized water with a pH of 7 is at least 20 mV. The use of the composite graphite material provided by the present application can improve the cohesion and bonding force of the negative electrode plate, thereby reducing the cyclic expansion of the secondary battery.

19 Claims, 3 Drawing Sheets

(51) Int. Cl.
*H01M 4/587* (2010.01)
*H01M 4/60* (2006.01)
*H01M 4/62* (2006.01)
*H01M 10/0525* (2010.01)
*H01M 4/02* (2006.01)

(52) U.S. Cl.
CPC ....... *H01M 4/622* (2013.01); *H01M 10/0525* (2013.01); *C01P 2002/74* (2013.01); *C01P 2004/03* (2013.01); *C01P 2004/61* (2013.01); *C01P 2006/10* (2013.01); *C01P 2006/11* (2013.01); *C01P 2006/12* (2013.01); *C01P 2006/40* (2013.01); *H01M 2004/027* (2013.01)

(58) Field of Classification Search
CPC ........... H01M 2004/027; H01M 4/133; H01M 4/1393; H01M 4/0471; H01M 4/62; C01B 32/21; C01P 2002/74; C01P 2004/03; C01P 2004/61; C01P 2006/10; C01P 2006/11; C01P 2006/12; C01P 2006/40; Y02E 60/10
See application file for complete search history.

(56) References Cited

FOREIGN PATENT DOCUMENTS

| | | |
|---|---|---|
| CN | 110364690 A | 10/2019 |
| EP | 3206244 A1 | 8/2017 |
| JP | 2005053752 A | 3/2005 |
| JP | 2011219318 A | 11/2011 |
| WO | 2015146787 A1 | 10/2015 |
| WO | 2015146787 | 4/2017 |
| WO | 2018199265 A1 | 11/2018 |
| WO | 2019139952 A1 | 7/2019 |

OTHER PUBLICATIONS

PCT International Search Report for PCT/CN2019/122712, dated Sep. 4, 2020, 13 pages.
The First Office Action for Japanese Application No. 2021-558689 dated Oct. 25, 2022, 5 pages.
The First Office Action for Chinese Application No. 201980066195.0, dated Feb. 2, 2023, 9 pages.
The Second Office Action for Japanese Application No. 2021-558689, dated Jan. 17, 2023, 5 pages.
The First Office Action for Indian Application No. 202117057359, dated Feb. 15, 2023, 6 pages.

COMPOSITE GRAPHITE MATERIAL, SECONDARY BATTERY, APPARATUS AND PREPARATION METHOD THEREOF

CROSS-REFERENCE TO RELATED APPLICATION

This application is a continuation of International Application No. PCT/CN2019/122712, filed on Dec. 3, 2019.

TECHNICAL FIELD

The present application belongs to the technical field of secondary batteries, and specifically relates to a composite graphite material, a secondary battery, an apparatus, and preparation method thereof.

BACKGROUND

Secondary batteries are widely used due to their outstanding features such as high energy density, no pollution, and long service life.

However, the volume of the secondary battery will expand during the cycle, which causes the internal stress of the battery to increase, thus affecting the service life and safety performance of the battery. For example, with the rapid popularity of new energy vehicles, the market has increasingly higher requirements for the service life and safety performance of power-type secondary batteries. In order to enhance the market competitiveness of new energy vehicles, it is indeed necessary to provide a new technology that can reduce the volume expansion of secondary batteries.

SUMMARY

This application provides a composite graphite material that can reduce the volume expansion of a secondary battery during the cycle, a secondary battery using the composite graphite material, an apparatus using the secondary battery, and a preparation method.

In order to achieve the above objective, a first aspect of the present application provides a composite graphite material including a core material and a coating layer coating at least a part of the surface of the core material, the core material including graphite; wherein the composite graphite material has an absolute value K of Zeta potential of at least 20 mV in deionized water with a pH of 7.

A second aspect of the present application provides a secondary battery, including a negative electrode plate which includes a negative active material, wherein the negative active material includes the composite graphite material according to the first aspect of the present application.

A third aspect of the present application provides an apparatus including the secondary battery according to the second aspect of the present application.

The fourth aspect of the present application provides a method for preparing a composite graphite material, including the step of coating at least a part of the surface of a core material including graphite with a coating material to obtain a composite graphite material; wherein the composite graphite material has an absolute value K of Zeta potential of at least 20 mV in deionized water with a pH of 7.

The fifth aspect of the present application provides a method for preparing a secondary battery, including the step of using the composite graphite material described in the first aspect of the present application to prepare a negative electrode plate.

In this application, the graphite core material is subjected to surface coating modification, so that the absolute value K of Zeta potential of the obtained composite graphite material in deionized water with a pH of 7 is at least 20 mV. The composite graphite material has good hydrophilicity, so its dispersion uniformity and stability in the aqueous slurry is higher, and the contact with the binder is more comprehensive. The negative electrode plate prepared by the slurry has higher cohesion and bonding force, thereby improving the cycle stability of the electrode plate, especially reducing the rebound of the electrode plate, thereby reducing the volume expansion of secondary battery during the cycle.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
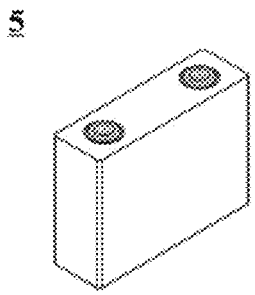
FIG. 1 is a schematic diagram of a secondary battery provided by an embodiment of the present application.

Among them, the reference signs are explained as follows:

1. Battery pack;
2. Upper case body;
3. Lower case body;
4. Battery module;
5. Secondary battery;
10. Core material;
20. Coating layer.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

As an economical, practical, clean and easy to control and convert energy form, electric energy is increasingly used in various apparatus. Secondary batteries have become the preferred power source for apparatus due to their advantages of high energy density, portability, no memory effect, and environmental friendliness.

The embodiment of the present application provides a secondary battery.

The secondary battery includes a positive electrode plate, a negative electrode plate, and an electrolyte. During the charging and discharging process of the battery, active ions are inserted and extracted back and forth between the positive electrode plate and the negative electrode plate. The electrolyte conducts ions between the positive electrode plate and the negative electrode plate.

[Negative Electrode Plate]

The negative electrode plate comprises a negative electrode current collector and a negative electrode film disposed on at least one surface of the negative electrode current collector. As an example, the negative electrode current collector has two opposite surfaces in its own thickness direction, and the negative electrode film is laminated on either or both of the two opposite surfaces of the negative electrode current collector.

The negative electrode current collector can be made of materials with good electrical conductivity and mechanical strength to play the role of conduction and current collection. In some embodiments, copper foil may be used as the negative electrode current collector.

The negative electrode film comprises a negative active material, and the negative active material comprises the composite graphite material provided in the embodiments of the present application. The use of the composite graphite material of the present application enables the secondary battery to have lower cycle expansion and higher energy density.

The composite graphite material of the embodiments of the present application comprises a core material and a coating layer coating at least a part of the surface of the core material comprising graphite; wherein the composite graphite material has an absolute value K of Zeta potential of at least 20 mV in deionized water with a pH of 7.

In the present application, the graphite core material is subjected to surface coating modification, so that the absolute value K of Zeta potential of the obtained composite graphite material in deionized water with a pH of 7 is at least 20 mV. The composite graphite material has good hydrophilicity, high dispersion uniformity and stability in the slurry, and more comprehensive contact with the binder. The negative electrode plate prepared by the slurry has higher cohesion and bonding force, thereby improving the physical structure stability of the electrode plate during the cycle, especially reducing the cyclic rebound of the electrode plate, thereby reducing the volume expansion of the secondary battery during the cycle.

The volume increase of the secondary battery during the cycle is smaller, which is conducive to making it have a higher energy density. In particular, secondary battery with a low cyclic expansion can maintain an internal structure suitable for electrolyte infiltration during the cycle, so that the electrolyte is fully infiltrated in the battery core, and thus can improve the cycle life of the secondary battery. The lower cyclic expansion can also reduce the internal stress of the battery core of the secondary battery, reduce the deformation of the battery core under the action of the internal stress, and effectively improve the safety performance of the secondary battery. The safety performance of the apparatus using the secondary battery can therefore be improved.

In the negative electrode plate prepared by the slurry, the distribution of the solid phase components such as the negative active material is more uniform, and the particles are more effectively contacted. As a result, the negative electrode plate forms and maintains a uniform and stable ion and electron transport network, and the secondary battery using it can obtain higher cycle performance.

In some embodiments, the absolute value K of Zeta potential of the composite graphite material in deionized water with a pH of 7 is at least 25 mV, at least 30 mV, or at least 35 mV. In this way, the composite graphite material can better exert the above-mentioned effects. The inventor found that when the composite graphite material satisfies 30 mV $\leq K \leq 40$ mV, the overall performance of the secondary battery using the composite graphite material can be improved.

In the present application, the Zeta potential is measured in accordance with the national standard GB/T 32668-2016 "Analysis of Zeta Potential of Colloids-Electrophoresis Guidelines". Specifically, the method for measuring the Zeta potential includes: adding 0.5 g of composite graphite material to 10 mL of deionized water with a pH of 7, and centrifuging at 9000 r/min for 5 minutes to obtain the upper liquid; using an electrophoretic light scattering method based on PALS (Phase Analysis Light Scattering) technology to measure the electrophoretic mobility under the conditions of a test temperature of 25° C., an electric field voltage of 4V, and a field frequency of 2 Hz; calculating the Zeta potential from the obtained electrophoretic mobility according to the Smoluchowski equation. In order to improve the test accuracy, test 5 times and take the average value. The test is performed in a Zeta Potential Analyzer, such as the Zeta PALS Ver. 5.75 Zeta Potential Analyzer from Brookhaven Instruments (BIC).

In some embodiments, the coating layer of the composite graphite material comprising a coating material having a nitrogen-containing heterocyclic moiety, and at least part of the nitrogen-containing heterocyclic moiety has a carbon-nitrogen double bond. In this way, the hydrophilicity of the composite graphite material is greatly improved, so that its Zeta potential is within the above-mentioned required range. Surprisingly, it is found that the composite graphite material coated with the coating layer can improve the cyclic expansion of the electrode plate and the battery, and its own gram capacity and kinetic characteristics are also improved, thereby improving the energy density and kinetic performance of battery's performance.

In some embodiments, the nitrogen-containing heterocycle also has a carbon-carbon double bond. The conductivity of the coating layer is further improved.

In some embodiments, the nitrogen-containing heterocycle is a five-membered ring or a six-membered ring. In this way, the coating layer has higher elasticity and toughness, can better adapt to the expansion and contraction caused by the core material's repeated extraction/intercalation of active ions, and isolates the surface of the core material from contact with the electrolyte, reducing the capacity loss of the composite graphite material due to the corrosion of due to the electrolyte, as such to improve the cycle performance of the battery.

In some embodiments, the nitrogen-containing heterocyclic moiety may comprise one or more of a pyridine ring, an imidazole ring, a quinoline ring, and a pyrimidine ring.

The coating layer with the above-mentioned structural fragments itself can participate in the deintercalation of active ions, and provides more channels for deintercalation of active ions, and provides additional capacity for the composite graphite material in addition to the core material, thereby increasing its gram capacity. This is unexpected by those skilled in the art, because in general, coating other coatings (such as amorphous carbon coatings, conventional polymer coatings) on the surface of composite graphite materials will result in the reduction of effective active materials, thereby reducing the gram capacity of the material. Moreover, considering the difficulty of further increasing the gram capacity of the composite graphite material. In addition, taking into account the difficulty of further increasing the gram capacity as the gram capacity of the composite graphite material approaches the theoretical value, the present application shows more important significance and technological progress for the improvement of the gram capacity of the composite graphite material.

In addition, since the coating layer with the above-mentioned structural fragments provides more channels suitable for the deintercalation of active ion, the active ion transmission efficiency of the material is improved. In addition, the coating layer also has good electronic conductivity. Therefore, the composite graphite material has better kinetic characteristics, which improves the kinetic performance of the battery using the same.

The nitrogen-containing heterocyclic moiety can be a fused ring or a non-fused ring. Preferably, the nitrogen-containing heterocyclic moiety comprises one or more of the fused aza-heterocyclic moiety of Formula 1 to Formula 3. Preferably, the nitrogen-containing heterocyclic moiety comprises a combination of at least two of Formula 1 to Formula 3. More preferably, the nitrogen-containing heterocyclic moiety comprises a combination of three of Formula 1 to Formula 3:

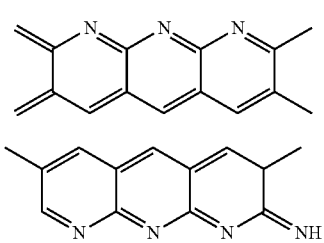

Formula 1

Formula 2

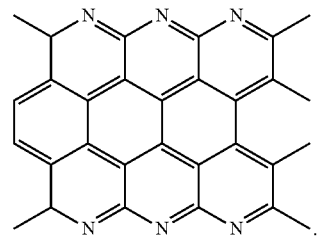

Formula 3

The inventor also found that in some embodiments, when heating from 40° C. to 800° C. in an inert non-oxidizing gas atmosphere the weight loss rate of the composite graphite material rate is from 0.1% to 0.55%, the graphite particles can enable the battery have better cycle performance and low-expansion performance. Preferably, the weight loss rate of the composite graphite material heated from 40° C. to 800° C. in an inert non-oxidizing gas atmosphere is from 0.1% to 0.4%, more preferably from 0.1% to 0.3%.

Examples of the aforementioned inert non-oxidizing gas comprise, but are not limited to, nitrogen, carbon dioxide, ammonia, and inert gases (for example, helium, argon), and combinations thereof. In some embodiments, nitrogen may be used as the inert non-oxidizing gas. Those skilled in the art can reasonably determine the heating rate during the weight-loss process. For example, the heating rate of the weight-loss process may be 10° C./min or lower, preferably 5° C./min or lower. As an example, the weight loss rate is measured at a rate of 10° C./min from 40° C. to 800° C. in a nitrogen atmosphere. The test is carried out with a thermogravimetric analyzer, such as STA449F3 simultaneous thermal analyzer.

In some embodiments, the core material of the composite graphite material may be one or more selected from artificial graphite and natural graphite.

In some preferred embodiments, when the core material of the composite graphite material is artificial graphite, controlling the following parameters of the composite graphite material within the given range will further improve its performance.

Peak D and Peak G are Raman characteristic peaks of composite graphite materials. The Peak D and Peak G of the composite graphite material can be measured by laser Raman spectroscopy, such as the LabRAM HR Evolution Raman spectrometer. The test can use a solid-state laser with a wavelength of 633 nm as the light source; macro Raman test mode is used and CCD detector is used. In order to improve the accuracy of the test, the composite graphite material powder is pressed into a tablet, on which 40 points can be randomly selected on for testing, and the average value thereof is taken. As an example, in the Raman spectrum of the composite graphite material measured by a Raman spectrometer, the peak D is at the position of 1300 $cm^{-1}$ to 1400 $cm^{-1}$, and the peak G is at the position of 1550 $cm^{-1}$ to 1620 $cm^{-1}$.

$I_D/I_G$ represents the ratio of the peak intensity $I_D$ of the peak D to the peak intensity $I_G$ of the peak G. In some embodiments, the $I_D/I_G$ of the composite graphite material is from 0.4 to 1.0, preferably from 0.5 to 0.9, and more preferably from 0.6 to 0.85. A composite graphite material having a suitable $I_D/I_G$ can not only have high kinetic characteristics, but also have high surface stability, reducing the side reactions of the electrolyte on the surface. Therefore, the use of composite graphite materials with a suitable $I_D/I_G$ can further improve the kinetic performance and low-expansion performance of the battery.

In some preferred embodiments, when the composite graphite material is in a negative electrode with a compaction density of 1.6 g/cm³~1.7 g/cm³, the ratio $C_{004}/C_{110}$ of the peak area of the 004 crystal plane to the peak area of the 110 crystal plane of the composite graphite material is $C_{004}/C_{110} \leqslant 15$. Therefore, the composite graphite material can have a smaller orientation under a higher compaction density of the electrode plate, thereby further reducing the volume expansion of the negative electrode plate and the secondary battery during the cycle.

When the composite graphite material is in a negative electrode plate with a compaction density of 1.6 g/cm³~1.7 g/cm³, the $C_{004}/C_{110}$ of the composite graphite material can be $\leqslant 15$, $\leqslant 13$, $\leqslant 12$ or $\leqslant 11.5$. Further, it can be $\geqslant 6$, $\geqslant 7$, $\geqslant 8$, or $\geqslant 8.5$. In this way, while improving the directional selectivity of the composite graphite material for desorption/intercalation of active ions, it also enables the negative electrode plate to have higher cohesion and bonding force, thereby further reducing the cyclic expansion of the electrode plate and the battery. Preferably, when the composite graphite material is in a negative electrode plate with a compaction density of 1.6 g/cm³~1.7 g/cm³, the composite graphite material satisfies $8 \leqslant C_{004}/C_{110} \leqslant 12$.

In some embodiments, the graphitization degree G of the composite graphite material is from 90% to 95%. The inventor found that an appropriate graphitization degree G can make the artificial graphite have a higher gram capacity, while improving its own phase structure stability during the cycle and the cohesion between particles, thereby further reducing the volume expansion of the negative electrode and battery during cycling. Preferably, the graphitization degree G of the composite graphite material is from 92% to 95%, more preferably from 92% to 94%.

In some embodiments, the volume average particle size $D_v50$ of the composite graphite material may be from 15 µm to 20 µm, preferably from 15 µm to 18 µm. A suitable $D_v50$ makes the composite graphite material have higher active ion and electron transport performance, and at the same time, it can also reduce the side reaction of the electrolyte in the negative electrode. In addition, a composite graphite material with a suitable $D_v50$ is also beneficial to increasing its own powder compaction density, so that the electrode plate using the composite graphite material can obtain a higher compaction density, and therefore can increase the energy density of the battery.

In some embodiments, the volume particle size $D_v10$ of the composite graphite material is greater than or equal to 6 µm. For example, the $D_v10$ of the composite graphite material can be 6 µm, 6.5 µm, 7 µm, or 7.5 µm. Further, the $D_v10$ of the composite graphite material may be 11 µm, $\leqslant 10.5$ µm, $\leqslant 10$ µm, $\leqslant 9.5$ µm, or 9 µm. The composite graphite material with a suitable $D_v10$ can further increase the compaction density of the electrode plate, and at the same time, further reduce the side reactions in the secondary battery. Preferably, the composite graphite material satisfies 6.5 µm $\leqslant D_v10 \leqslant 10.5$ µm.

The inventor found that by making the numerical particle size $D_n10$ of the composite graphite material is at least 1 µm, the side reaction of the electrolyte at the negative electrode interface can be reduced, the cyclic expansion force in the negative electrode plate and the secondary battery can be reduced, and the gram capacity of graphite material can be further improved. Therefore, in some embodiments, the $D_n10$ of the composite graphite material may be $\geqslant 1$ µm, $\geqslant 1.2$ µm, or $>1.5$ µm; and may be $\leqslant 3$ µm, $\leqslant 2.5$ µm, or $\leqslant 2$ µm. Moreover, the composite graphite material contains an appropriate amount of smaller particles, so that in the negative electrode plate using it, the smaller particles can be filled in the pores between the larger particles, resulting in that the electrode plate has a suitable porosity for the full infiltration of the electrolyte, at the same time the compaction density of the electrode plate is further improved. Therefore, the energy density of the battery can be further improved. Preferably, the composite graphite material satisfies 1 µm $\leqslant D_n10 \leqslant 3$ µm; more preferably, 1.2 µm $\leqslant D_n10 \leqslant 2$ µm.

In some embodiments, the specific surface area SSA of the composite graphite material may be 0.5 m²/g~1.3 m²/g, preferably 0.6 m²/g~1.0 m²/g. The composite graphite material having a suitable specific surface area can have a strong bonding force with the binder, and can reduce the side reaction of the electrolyte on its surface, thereby further reducing the cyclic expansion of the secondary battery. Artificial graphite with a suitable specific surface area also has higher electrochemical reaction activity, which can further improve the kinetic performance of the secondary battery.

In some embodiments, the tap density of the composite graphite material may be from 0.8 g/cm³ to 1.15 g/cm³, preferably from 0.9 g/cm³ to 1.05 g/cm³. Using composite graphite material with a suitable tap density, the negative electrode plate can have a suitable porosity, thereby ensuring that the electrode plate has better electrolyte infiltration performance, so that the battery has a higher cyclic performance.

In some embodiments, the powder compaction density of the composite graphite material under a pressure of 5 tons is from 1.80 g/cm³ to 2.10 g/cm³, preferably from 1.93 g/cm³ to 2.05 g/cm³. The composite graphite material has a higher powder compaction density, so that the negative electrode plate using it has a higher compaction density, thereby further improving the energy density of battery.

In some preferred embodiments, the gram capacity of the composite graphite material is from 350 mAh/g to 359 mAh/g, such as from 350 mAh/g to 357 mAh/g, or from 352 mAh/g to 355 mAh/g. The composite graphite material has not only higher gram capacity, but also higher structural stability and cohesion between particles, thereby further reducing the cyclic expansion of the electrode plate and the battery.

In some embodiments, the negative active material may further comprise other active materials that can be used in the negative electrode of a secondary battery. As an example, other active materials may be one or more of mesophase carbon microspheres (MCMB in short), hard carbon, soft carbon, silicon-based materials, and tin-based materials.

In some embodiments, the negative electrode film further comprises a binder. As an example, the binder may comprise one or more of styrene butadiene rubber (SBR), sodium carboxymethyl cellulose (CMC-Na), polyacrylic acid (PAA), sodium polyacrylate (PAAS), polyvinyl alcohol (PVA), sodium alginate (SA), polymethacrylic acid (PMAA), and carboxymethyl chitosan (CMCS).

In some preferred embodiments, the binder comprises a copolymer A. The copolymer A can be used alone or together with other binders. When the copolymer A is contained in the binder, the cohesion and bonding force of the negative electrode plate can be further improved, thereby further improving the low cyclic expansion performance of the electrode plate and the battery.

The copolymer A comprises at least a first monomer unit represented by formula (I), a second monomer unit represented by formula (II), and a third monomer unit represented by formula (III):

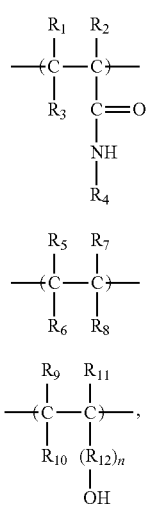

Formula (I)

Formula (II)

Formula (III)

in which $R_1$, $R_2$, $R_3$, $R_5$, $R_6$, $R_7$, $R_9$, $R_{10}$, and $R_{11}$ are each independently selected from hydrogen, a linear or branched alkyl group having 1 to 8 carbon atoms. As a non-limiting example, a linear or branched alkyl group having 1 to 8 carbon atoms can be selected from methyl, ethyl, n-propyl, isopropyl, n-butyl, isobutyl, sec-butyl, tert-butyl, n-pentyl, isopentyl, n-hexyl, n-heptyl, n-octyl, and the like.

"Each independently selected from" means that $R_1$, $R_2$, $R_3$, $R_5$, $R_6$, $R_7$, $R_9$, $R_{10}$, and $R_{11}$ are independent from each other, and the selection of each of the groups is made without limited by the selection of the other groups.

$R_4$ is selected from hydrogen, a substituted or unsubstituted alkyl group having 1 to 8 carbon atoms. As a non-limiting example, a substituted or unsubstituted alkyl group having 1 to 8 carbon atoms can be selected from methyl, ethyl, n-propyl, isopropyl, n-butyl, isobutyl, sec-butyl, tert Butyl, n-pentyl, isopentyl, n-hexyl, n-heptyl, n-octyl, groups in which one or more of their respective hydrogens are replaced by other elements or groups, and the like. Other elements can be, but are not limited to, F, Cl, O, and the like. Other groups can be, but are not limited to, hydroxyl, amino, methyl, methoxy group and the like.

$R_8$ is selected from —COOM, sulfonate phenyl, and sodium sulfonate phenyl, and M is selected from H, and positive monovalent (+1) alkali metal ion.

n is 0 or 1. When n is 0, the formula (III) is

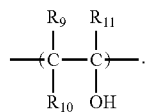

When n is 1, Rig is selected from a substituted or unsubstituted alkylene group having 1 to 8 carbon atoms. As a non-limiting example, a substituted or unsubstituted alkylene group having 1 to 8 carbon atoms may be selected from methylene, ethylene, propylene, isopropylene, butylene, isobutylene, sec-butylene, tert-butylene, pentylene, isopentylene, hexylene, heptylene, octylene, groups in which one or more of their respective hydrogens are replaced by other elements or groups, and the like. Other elements can be, but are not limited to, F, Cl, O, and the like. Other groups can be, but are not limited to, hydroxyl, amino, methyl, methoxy group and the like.

The active hydrogen contained in the first monomer unit makes the copolymer A have strong intramolecular and intermolecular hydrogen bonds, so that the force between the copolymer A and the negative active material and the current collector is far greater than the bonding force of other binders (such as SBR). Therefore, the copolymer A containing the first monomer unit as a binder can further improve the cohesion and bonding force of the negative electrode plate, thereby further reducing the cyclic expansion of the electrode plate and the battery.

In some preferred embodiments, $R_1$, $R_2$, and $R_3$ may each independently be selected from hydrogen, a linear or branched alkyl group having 1 to 4 carbon atoms. As a non-limiting example, a linear or branched chain alkyl group having 1 to 4 carbon atoms can be selected from H, methyl, ethyl, n-propyl, isopropyl, n-butyl, isobutyl, sec-butyl, and tert-butyl. Preferably, $R_1$ is H; $R_2$ is selected from H, and a linear or branched alkyl with 1 to 4 carbon atoms; $R_3$ is selected from H, and methyl.

$R_4$ can be selected from hydrogen, a substituted or unsubstituted alkyl group having 1 to 4 carbon atoms. As a non-limiting example, a substituted or unsubstituted alkyl group with 1 to 4 carbon atoms can be selected from methyl, ethyl, n-propyl, isopropyl, n-butyl, isobutyl, sec-butyl, tert-butyl, groups in which one or more of their respective hydrogens are substituted by one or more of F, Cl, O, hydroxyl, and amine group, and the like. For example, $R_4$ can be selected from hydroxymethyl, hydroxyethyl, hydroxypropyl, 2-hydroxypropyl, 2-dim ethyl aminoethyl, and 1,1-dimethyl-3-oxobutyl.

In some more preferred embodiments, the first monomer unit comprises at least one of monomer units derived from A1 to A3 monomers; more preferably, the first monomer unit comprises monomer units derived from A1 monomer:

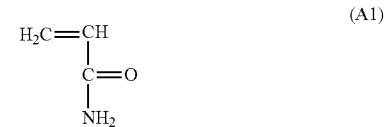

(A1)

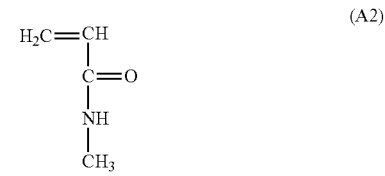

(A2)

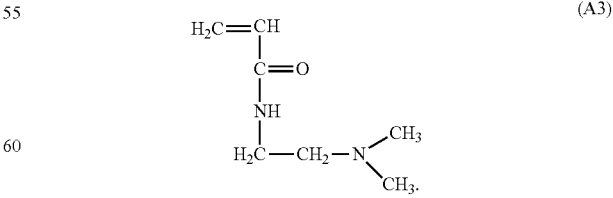

(A3)

The inventor found that by making the copolymer A contain an appropriate amount of the first monomer unit, it can provide a stronger hydrogen bonding effect, which can further increase the strength of the electrode plate and reduce the rebound of the electrode plate. In some embodiments, based on the total moles of the first monomer unit, the second monomer unit, and the third monomer unit, the content B1 of the first monomer unit is ≥40 mol %, preferably 45 mol % to 85 mol %, more preferably 60 mol % to 80 mol %.

The second monomer unit can improve the solubility of the copolymer A in the aqueous slurry, and at the same time can improve the dispersibility of the copolymer A to the negative active material, thereby further improving the stability of the slurry. Therefore, the cohesion and bonding force of the negative electrode plates are further improved, thereby further improving the stability of the physical structure and of the conductive network of the electrode plate during the cycle, and in particular, further reducing the rebound of the electrode plates. The secondary battery can obtain better cycle performance and low expansion performance.

In some preferred embodiments, $R_5$, $R_6$, and $R_7$ can each be independently selected from hydrogen, a linear or branched alkyl group having 1 to 4 carbon atoms. As a non-limiting example, a linear or branched chain alkyl group having 1 to 4 carbon atoms can be selected from H, methyl, ethyl, n-propyl, isopropyl, n-butyl, isobutyl, sec-butyl, and tert-butyl. Preferably, $R_5$ is H; $R_6$ is selected from H, and a linear or branched alkyl group having 1 to 4 carbon atoms; $R_7$ is selected from H and methyl.

$R_8$ can be selected from —COOM, sulfonate phenyl, and sodium sulfonate phenyl, M is selected from H, and positive monovalent alkali metal ion, preferably selected from positive monovalent alkali metal ion, more preferably selected from Li+, Na+, and K+. Preferably, $R_8$ can be selected from —COOLi, —COONa, —COOK, and sodium sulfonate phenyl.

In some more preferred embodiments, the second monomer unit comprises at least one of monomer units derived from B1~B3 monomers; more preferably, the second monomer unit comprises monomer units derived from B1 monomer.

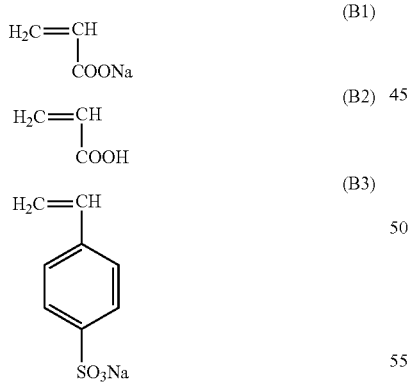

The inventors also found that by making the copolymer A contain an appropriate amount of second monomer units, the material can be provided with excellent dispersion performance, the slurry can be more stabilized, and the processing performance can be improved. In some embodiments, based on the total moles of the first monomer unit, the second monomer unit, and the third monomer unit, the content B2 of the second monomer unit is ≤29.5 mol %, preferably from 6 mol % to 28 mol %, more preferably from 8 mol % to 18 mol %.

The third monomer unit can improve the glass transition temperature Tg and flexibility of the copolymer A, and can also increase the force between the copolymer A and the negative active material and the current collector, thereby optimizing the processing performance and improving the bonding force. In this way, the cohesion and bonding force of the negative electrode plates are further improved, so the cycle life and anti-swelling performance of the battery can be improved.

In some preferred embodiments, $R_9$, $R_{10}$, and $R_{12}$ may each independently be selected from hydrogen, and a linear or branched alkyl group having 1 to 4 carbon atoms. As a non-limiting example, a linear or branched chain alkyl group having 1 to 4 carbon atoms can be selected from H, methyl, ethyl, n-propyl, isopropyl, n-butyl, isobutyl, sec-butyl, and tert-butyl. Preferably, $R_9$ is H; $R_{10}$ is selected from H, and a linear or branched alkyl group having 1 to 4 carbon atoms; Ru is selected from H, and methyl.

n is preferably 1. $R_{12}$ may be selected from a substituted or unsubstituted alkylene group having 1 to 8 carbon atoms, and is preferably selected from a substituted or unsubstituted alkylene group having 1 to 4 carbon atoms. Preferably, Ru may be selected from methylene, ethylene, propylene, isopropylene, butylene, isobutylene, sec-butylene, tert-butylene, and the like, more preferably methylene, and propylene.

In some more preferred embodiments, the third monomer unit comprises at least one of monomer units derived from C1~C3 monomers; more preferably, the third monomer unit comprises monomer units derived from C2 monomer.

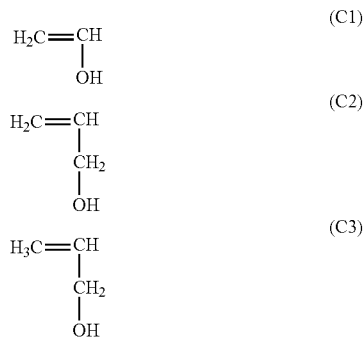

In some embodiments, based on the total moles of the first monomer unit, the second monomer unit, and the third monomer unit, the content of the third monomer unit B3 is ≤30.5 mol %, preferably from 7.5 mol % to 30 mol %, more preferably from 12 mol % to 24 mol %. By setting the content of the third monomer unit in an appropriate range, the above-mentioned effects can be better exerted.

In some embodiments, an aqueous solution containing 10% by weight of copolymer A has a pH of above 7. When the pH value of the copolymer A is within the given range, the copolymer A does not contain or substantially does not contain ester groups (such as methyl carboxylate group, ethyl carboxylate group, propyl carboxylate group, butyl carboxylate group, hydroxyethyl carboxylate group, glyceride carboxylate group, etc.), which can improve the stability of copolymer A and ensure the long-term effective display of the above-mentioned effects. Preferably, the pH of an aqueous solution containing 10% by weight of copolymer A is 8-9, in which the copolymer A is dissolved in deionized water and the weight percentage of the copolymer A is 10% to obtain the "an aqueous solution containing 10% by weight of copolymer A".

In some embodiments, the glass transition temperature Tg of copolymer A is preferably from 30° C. to 80° C., more preferably from 40° C. to 70° C., which can further optimize the processability of copolymer A and improve its adhesion.

The Tg of copolymer A can be measured in a conventional manner in the art. For example, the glass transition temperature Tg of the copolymer can be measured by differential scanning calorimetry (DSC), which is well known to those skilled in the art. For example, a STA 449 F3-typed NETZSCH device can be used for such measurement.

The molecular weight of copolymer A can vary within a relatively wide range. In some embodiments, the weight average molecular weight of the copolymer A may be from 100,000 to 1,000,000, for example, from 200,000 to 800,000.

The molecular weight of copolymer A can be measured in a conventional manner in the art. For example, the laser light scattering method can be used for such measurement. This technique is well known to those skilled in the art.

In some embodiments, the negative electrode film optionally further comprise a conductive agent. As an example, the conductive agent used for the negative electrode film can be one or more selected from graphite, superconducting carbon, acetylene black, carbon black, Ketjen black, carbon dots, carbon nanotubes, graphene, and carbon nanofibers.

In the present application, the $D_v 50$, $D_v 10$, and $D_v 10$ of the composite graphite material can be measured with a laser particle size analyzer (such as Malvern Master Size 3000) with reference to the standard GB/T 19077.1-2016.

Among them, the physical definitions of $D_v 50$, $D_v 10$, and $D_v 10$ are as follows:

$D_v 50$: the particle size when the cumulative volume distribution percentage of the material reaches 50%;

$D_v 10$: the particle size when the cumulative volume distribution percentage of the material reaches 10%;

$D_n 10$: the particle size when the cumulative number distribution percentage of the material reaches 10%.

The specific surface area of the composite graphite material can be measured using methods known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

X-ray diffraction analysis is used to test the $C_{004}/C_{110}$ of the composite graphite material. The X-ray diffraction analysis can refer to the standard JISK 0131-1996, using an X-ray diffractometer (for example, Bruker D8 Discover X-ray diffractometer), wherein a copper target is used as the anode target, CuKα rays are used as the radiation source, the ray wavelength is λ=1.5418 Å, the scanning angle range for 2θ is from 20° to 80°, and the scanning rate is 4°/min.

The negative electrode plate can be prepared according to the following method to test $C_{004}/C_{110}$: the composite graphite material of the present application, styrene-butadiene rubber (SBR) used as a binder, sodium carboxymethyl cellulose (CMC-Na) used as a thicker, and conductive carbon black (Super P) used as a conductive agent are dispersed at a mass ratio of 96.2:1.8:1.2:0.8 in the solvent deionized water and mixed uniformly to prepare the negative electrode slurry; the negative electrode slurry is evenly coated on the copper foil current collector, and the coated areal density can be from 10 mg/cm$^2$ to 11 mg/cm$^2$ (such as 10.7 mg/cm$^2$). Then the resulting electrode plate is dried, cold pressed by a cold press. The compaction density after cold pressing is from 1.6 g/cm$^3$ to 1.7 g/cm$^3$ (such as 1.65 g/cm$^3$). The finally prepared electrode plate is placed in an X-ray diffractometer, and the peak area $C_{004}$ of the 004 crystal plane diffraction peak of the composite graphite material in the electrode plate and the peak area $C_{110}$ of the 110 crystal plane diffraction peak of the composite graphite material in the electrode plate are obtained by X-ray diffraction analysis, then $C_{004}/C_{110}$ can be obtained by calculation.

The tap density of the composite graphite material can be measured using methods known in the art. For example, refer to the standard GB/T 5162-2006 and use a powder tap density tester (such as Bettersize BT-301, Dandong, China) to test.

The powder compaction density of the composite graphite material can be tested by methods known in the art. For example, refer to GB/T 24533-2009 and use an electronic pressure testing machine (such as UTM7305) to test: put a certain amount of powder on a special compaction mold, set different pressures, and read the thickness of the powder under different pressures on the equipment, and calculate the compaction density under different pressures.

The graphitization degree of the composite graphite material can be measure using an X-ray diffractometer (Bruker D8 Discover). The test can refer to JIS K 0131-1996, JB/T 4220-2011, measure the size of $d_{002}$, and then calculate the graphitization degree according to the formula $G=(0.344-d_{002})/(0.344-0.3354)$, in which $d_{002}$ is the interlayer spacing in the graphite crystal structure, in nm.

[Positive Electrode Plate]

The positive electrode plate comprises a positive electrode current collector and a positive electrode film which is disposed on at least one surface of the positive electrode current collector and comprises a positive active material. As an example, the positive electrode current collector has two opposite surfaces in its own thickness direction, and the positive electrode film is laminated on either or both of the two opposite surfaces of the positive electrode current collector.

The positive electrode current collector can be made of materials with good electrical conductivity and mechanical strength. In some embodiments, the positive electrode current collector may be an aluminum foil.

The present application does not specifically limit the specific types of positive active materials, and materials known in the art for the positive electrode of secondary battery can be used, and those skilled in the art can make selections according to actual needs.

In some embodiments, the secondary battery can be a lithium ion battery, optionally, the positive active material may be selected from lithium transition metal oxides and modified materials thereof, and the modified material may be lithium transition metal oxide subjected to doping modification and/or coating modification. Optionally, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

For example, the positive active material of the secondary battery can be one or more selected from $LiCoO_2$, $LiNiO_2$, $LiMnO_2$, $LiMn_2O_4$, $LiN_{1/3}Co_{1/3}Mn_{1/3}O_2$(NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film may also comprise a binder. The types of the binder are not specifically limited, and those skilled in the art can make selections according to actual needs. Optionally, the binder used for the positive electrode film may comprise one or more of polyvinylidene fluoride (PVDF) and polytetrafluoroethylene (PTFE).

In some embodiments, the positive electrode film may also comprise a conductive agent. The types of the conductive agent are not specifically limited, and those skilled in the art can make selections according to actual needs. Optionally, the conductive agent used for the positive electrode film may comprise one or more of graphite, superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. There is no specific limitation on the type of electrolyte in the present application, and it can be selected according to the requirement. For example, the electrolyte may be selected from at least one of solid electrolyte and liquid electrolyte (i.e., electrolytic solution).

In some embodiments, an electrolytic solution is used as the electrolyte. The electrolytic solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

[Separator]

In secondary batteries that use electrolyte, and some secondary batteries that use solid electrolytes, a separator is also included. The separator is located between the positive electrode plate and the negative electrode plate to play a role of isolation. The separator is not particularly limited, and any well-known porous structure separator having electrochemical stability and mechanical stability can be selected. In some embodiments, the separator can be one or more of glass fiber, non-woven fabric, polyethylene, polypropylene, and polyvinylidene fluoride. The separator can be a single-layer film or a multilayer film. When the separator is a multilayer film, the materials of each layer may be the same or different.

[Outer Packaging]

In some embodiments, the secondary battery may comprise an outer packaging which is used to encapsulate the positive electrode plate, the negative electrode plate and the electrolyte. As an example, the positive electrode plate, the negative electrode plate and the separator can be laminated or wound to form a battery core with a laminated structure or a battery core with a wound structure, then the battery core is encapsulated in an outer packaging; the electrolyte can be an electrolytic solution, which is used to infiltrate the battery core. The number of battery cores in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), polybutylene succinate (PBS). The outer packaging of the battery may also be a hard case, such as a hard plastic case, an aluminum case, or a steel case.

[Preparation]

The preparation of the secondary battery may comprise the step of assembling the negative electrode plate, the positive electrode plate, and the electrolyte to form a secondary battery. In some embodiments, the positive electrode plate, the separator, and the negative electrode plate can be wound or laminated in order, so that the separator is located between the positive electrode plate and the negative electrode plate to play a role of isolation, as such to obtain a battery core; the battery core is placed in an outer package case, and then an electrolyte is injected and sealed to obtain a secondary battery.

In some embodiments, the preparation of the secondary battery may further comprises the step of preparing a positive electrode plate. As an example, a positive active material, a conductive agent, and a binder can be dispersed in a solvent (such as N-methylpyrrolidone, NMP for short) to form a uniform positive electrode slurry; the positive electrode slurry can be coated on a positive electrode current collector; after being dried, cold pressed and other processes, the positive electrode plate is obtained.

In some embodiments, the preparation of the secondary battery comprises the step of using the composite graphite material of the present application to prepare a negative electrode plate.

In some embodiments, the step of using the composite graphite material of the present application to prepare a negative electrode plate may comprise: dispersing the negative active material comprising the composite graphite material of the present application, a binder, and an optional thickeners and a conductive agent in a solvent which can be deionized water to form a uniform negative electrode slurry; the negative electrode slurry is coated on the negative electrode current collector, and after the steps of drying and cold pressing, a negative electrode plate is obtained.

In some preferred embodiments, in the step of preparing the negative electrode plate, the binder comprises the copolymer A described above.

Next, the present application also provides a method for preparing the composite graphite material, by which the composite graphite material of the present application can be prepared.

The preparation method of the composite graphite material comprises the step of coating at least a part of the surface of the core material containing graphite with a coating material to obtain the composite graphite material.

The coating material can be selected from materials that make the absolute value of Zeta potential of the composite graphite material in deionized water with a pH of 7 K be at least 20 mV, under the premise that the electrochemical performance of the composite graphite material after coating is not substantially affected. For example, the coating materials are described above and will not be repeated here.

In some embodiments, the step of coating at least a part of the surface of the core material with the coating material to obtain the composite graphite material comprises the following steps:

S100: mixing a solution containing a nitrogen-containing heterocyclizable polymer with a core material so that the polymer coats at least a part of the surface of the core material to obtain a slurry, wherein the mass ratio of the core material to the polymer is $m_G:m_P \leqslant 400:1$;

S200: drying the slurry to obtain a staring material containing the core material and the polymer layer coating at least a part of the surface of the core material;

S300: subjecting the starting material to a heat treatment at a temperature of 300° C. to 400° C. for a heat treatment time of at least 2 hours, so that the polymer is heterocyclized to obtain a coating material with a fused aza-heterocyclic moiety, and at least part of the nitrogen-containing heterocycle in the fused aza-heterocyclic moiety has a carbon-nitrogen double bonds to obtain a composite graphite material.

The degree of cyclization and carbonization of the polymer can be controlled by adjusting the amount of the coated polymer and the temperature and time of the heat treatment. Through a large number of experiments, the inventor of the present application found a more preferable amount of starting materials, temperature and time of the heat treatment step. The advantages of adjusting the amount of the coating layer within a certain range are as discussed above, and will not be repeated here.

In some preferred embodiments, the mass ratio $m_G:m_P$ of the core material to the polymer may be from 30:1 to 400:1, preferably from 34:1 to 250:1, more preferably from 40:1 to 200:1, especially preferably from 50:1 to 150:1.

In some preferred embodiments, in step S100, the polymer comprises polyacrylonitrile (PAN) or the copolymers thereof, preferably polyacrylonitrile or the copolymers of acrylonitrile with acrylic or propylene monomers, more preferably polyacrylonitrile. Especially preferably, the polymer is or comprises polyacrylonitrile.

In some embodiments, the number average molecular weight of the nitrogen-heterocyclizable polymer is 50,000-150,000 Da, preferably 80,000-120,000 Da.

In some embodiments, in step S100, the solvent of the solution may comprise one or more of N-dimethylformamide, N,N-dimethylacetamide, N-methylpyrrolidone, and dimethylsulfoxide. Preferably, the solvent may be or comprises N-dimethylformamide.

The solution in step S100 can be obtained by a method known in the art. For example, the solution can be obtained by dissolving the polymer in a solvent and stirring until the dispersion is uniform.

In step S200, a method known in the art can be used to dry the slurry. For example, drying methods include, but are not limited to, spray drying, flash evaporation, rotary evaporation, freeze drying, and the like.

In some embodiments, spray drying is used in step S200. A peristaltic pump can be used to pump the slurry into the spray drying equipment for drying. The speed of the peristaltic pump can be from 10 rpm to 30 rpm, or from 18 rpm to 20 rpm.

The drying temperature in step S200 can be adjusted according to the solvent used in the solution or slurry. In some embodiments, preferably, in step S200, the drying is a spray drying performed at a temperature from 180° C. to 210° C. More preferably, the drying is a spray drying performed at a temperature from 190° C. to 205° C.

In some embodiments, in step S300, the heat treatment is performed in an inert non-oxidizing gas. Examples of inert non-oxidizing gases comprise, but are not limited to, nitrogen, carbon dioxide, ammonia, and inert gases (such as helium, argon, etc.), and combinations thereof. In some preferred embodiments, nitrogen can be used as the inert non-oxidizing gas.

In some embodiments, in step S300, the heat treatment may be performed at a temperature of 350° C. to 400° C. In the heat treatment process, the heat treatment temperature has a key influence on the cyclization and carbonization of the nitrogen-containing heterocyclic polymer (especially polyacrylonitrile or copolymer thereof). The inventor found that when the heat treatment is performed at 200° C. or lower, the polymer coating layer has not been thermally cracked and is still in a polymer state, and the polymer itself has no gram capacity, so the gram capacity of the coated material is reduced. When the temperature increases from 300° C. to 400° C., as the temperature increases, the coating layer begins to decompose, the gram capacity of the material increases, and the anti-swelling performance is also improved to the maximum. As the temperature further increases, for example, when the heat treatment is performed at a temperature of 500° C. or higher, the degree of disorder of the coating layer itself after polymer decomposition decreases, which cannot improve the cyclic expansion of the electrode plate. Therefore, the degree of polymer cyclization and carbonization can be adjusted by strictly controlling the temperature of the heat treatment. By controlling the temperature of the above-mentioned preferred heat treatment, it is possible to better control the partial carbonization of the cyclizable polymer (especially polyacrylonitrile) while maintaining the cyclic moiety discussed above.

In some embodiments, in step S300, the heat treatment time may be from 2 hours to 6 hours, preferably from 3 hours to 6 hours, and more preferably from 3 hours to 5 hours. By adopting an appropriate heat treatment time, the degree of cyclization and carbonization of the nitrogen-containing heterocyclic polymer (especially polyacrylonitrile or copolymer thereof) can be controlled, so that the coating layer has the cyclic moiety discussed above.

It is worth noting that the degree of cyclization and carbonization also affects the weight loss rate of the composite graphite material from 40° C. to 800° C. in an inert non-oxidizing gas atmosphere. By controlling the degree of cyclization and carbonization of the polymer, the weight loss rate can be within the above-mentioned range.

Next, a preparation method of artificial graphite is provided, and the artificial graphite prepared by the preparation method can be used as the core material of the composite graphite material of the present application.

The method for preparing artificial graphite provided by the embodiment of the application includes the following steps:

S10. crushing the green coke materials and classifying them;

S20, shaping the product obtained in step S10.

S30. granulating the product obtained in step S20, wherein the amount of a binder added in the granulation process does not exceed 5% of the total weight of the raw coke material.

S40: performing graphitization treatment on the product obtained in step S30 to obtain the artificial graphite.

Regarding the above preparation method, in step S10, the green coke material may be selected from one or more of greed petroleum coke, green pitch coke and metallurgical coke, and preferably comprises green petroleum coke.

Preferably, the green coke is non-needle coke. Preferably, the non-needle coke comprises one or more of non-needle green petroleum coke and non-needle green pitch coke; more preferably, the non-needle coke comprises non-needle green petroleum coke.

In some embodiments, in step S10, preferably, the volatile content of the green coke is 6%-12% (weight percentage). For example, the volatile content of the green coke powder can be 6% or more, 7% or more; and can be 12% or less, 11% or less, 10% or less, or 9% or less. Preferably, the volatile content of the green coke is 7%-10%. The volatile content of the green coke is appropriate, which can make the artificial graphite have a higher structural strength and a higher gram capacity.

The volatile content of the green coke can be tested using methods known in the art. For example, refer to SH/T 0026-1990.

In some embodiments, the sulfur content of the green coke may be 2% or less, 1.5% or less, 1% or less, or 0.5% or less. The green coke has a low sulfur content, which can reduce the probability that the specific surface area of artificial graphite will increase due to the escape of more sulfur components in the subsequent process, thereby reducing the side reaction of the electrolyte on the surface of the composite graphite material, thereby reducing the cyclic expansion of the battery. Preferably, the sulfur content of the green coke is 1% or less.

The sulfur content of green coke can be tested by methods known in the art, for example, with reference to GB/T 2286-2008.

In step S10, equipment and methods known in the art can be used to crush the green coke material, such as jet mill, mechanical mill or roller mill. The crushing process often produces a lot of too small particles, sometimes there are too large particles, so after crushing, it can be classified according to the requirements to remove the too small particles and the too large particles in the powder after crushing. After the classification treatment, a granular product with a better particle size distribution can be obtained, which is convenient for the subsequent shaping and granulation process. The classification treatment can be carried out by using equipment and methods known in the art, such as a classification screen, a gravity classifier, a centrifugal classifier, and the like.

By adjusting the particle size distribution of the granular product obtained in step S10, such as $D_v10$, $D_v50$ and/or $D_v90$ within an appropriate range, the degree of granulation in the subsequent granulation step can be improved, and the artificial graphite itself can have a higher degree of isotropy and also have a higher gram capacity, thereby improving the corresponding structure and performance of the composite graphite material.

In step S20, the edges and corners of the granular product obtained in step S10 are polished by shaping. This facilitates the subsequent granulation process and makes the obtained composite graphite material have higher structural stability.

In step S20, equipment and methods known in the art may be used to perform shaping treatment on the granular product obtained in step S10, such as a shaping machine or other shaping equipment.

In some embodiments, step 20 further includes removing fine powder after shaping. The $D_n10$ of the precursor after shaping is adjusted to be in an appropriate range through the fine powder treatment, so that the $D_n10$ of the obtained artificial graphite is in the desired range. Preferably, the particle size $D_n10$ of the precursor is controlled to be at least 0.5 µm, for example, from 0.5 µm to 1.5 µm, through the fine powder removal treatment.

The inventor found that the gram capacity of the composite graphite material can be improve by removing the fine powder after the shaping in step 20.

Equipment and methods known in the art can be used to remove fine powder, such as a grading screen, a gravity classifier, a centrifugal classifier, and the like.

In step S30, the granular product obtained in step S20 is granulated, so that the independently dispersed primary particles are aggregated to form secondary particles, which can significantly increase the isotropy of artificial graphite, thereby reducing the $C_{004}/C_{110}$ of the composite graphite material, in which the amount of binder (for example, asphalt, etc.) added during the granulation process does not exceed 5% of the total weight of the green coke material; preferably, the granulation process is performed without adding a binder. When the amount of binder is controlled within the given range, the gram capacity of artificial graphite can be further improved; especially, in the absence of binder, the self-adhesive properties of green coke can be used for granulation. It can improve the overall structural strength of artificial graphite particles. When the artificial graphite is used as the core material of the composite graphite material of the present application, the corresponding characteristics of the composite graphite material are also improved. Preferably, when the volatile content of the green coke material is more than 7%, the step S30 can granulate the granular product obtained in step 20 without adding a binder. However, the volatile content of green coke materials should not be too high, otherwise it will significantly reduce the gram capacity of graphite and affect its processing performance during subsequent use.

In step S30, equipment known in the art may be used for granulation, such as a granulator. The granulator usually comprises a stirred reactor and a module for temperature control of the reactor. By adjusting the stirring speed, heating rate, granulation temperature, cooling rate, and the like during the granulation process, it is beneficial to improving the structural strength and isotropy of the obtained artificial graphite, so that the $C_{004}/C_{110}$ of the composite graphite material can meet the demand.

Furthermore, by adjusting the above process conditions, the volume average particle size $D_v50$ of the granulated product can be within the required range, or the $D_v10$, $D_v50$, and $D_v90$ of the granulated product can all be within the required range.

By adjusting the particle size distribution of step S10 and/or S30, the $D_v50$ and $D_v10$ of the finally obtained composite graphite material can be within the required range. By adjusting the particle size distribution of the composite graphite material within a proper range, it is also beneficial to obtaining proper tap density and powder compaction density.

In step S40, the granulated product obtained in step S30 is graphitized to obtain an artificial graphite with a suitable graphitization degree, so that the graphitization degree of the composite graphite material can meet the demand. In some embodiments, the temperature for graphitization in step S40 may be from 2800° C. to 3200° C., preferably from 2900° C. to 3100° C.

In step S30, graphitization can be performed using equipment known in the art, such as a graphitization furnace, and further, for example, an Acheson graphitization furnace. After the graphitization process is completed, a small amount of oversized particles formed by agglomeration of the granulated product during the high temperature graphitization process can be removed by sieving. This can prevent oversized particles from affecting material processing properties, such as stability and coating properties of the slurry.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
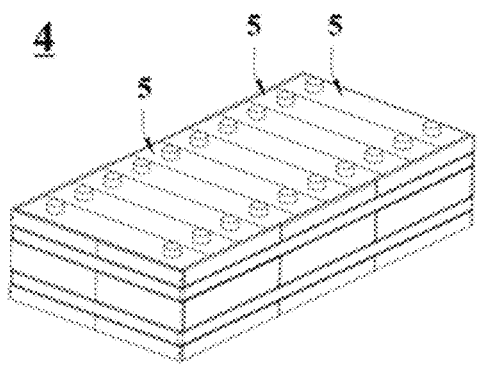
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
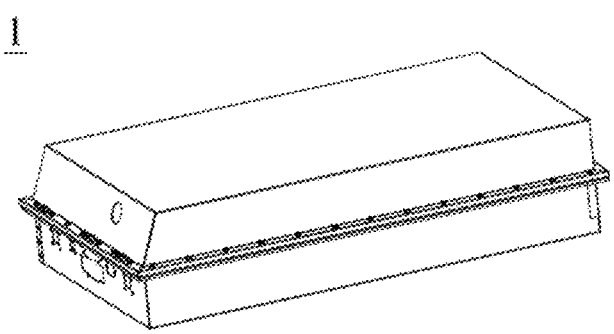
FIG. 3 is a schematic diagram of a battery pack provided by an embodiment of the present application.
Figure 4:
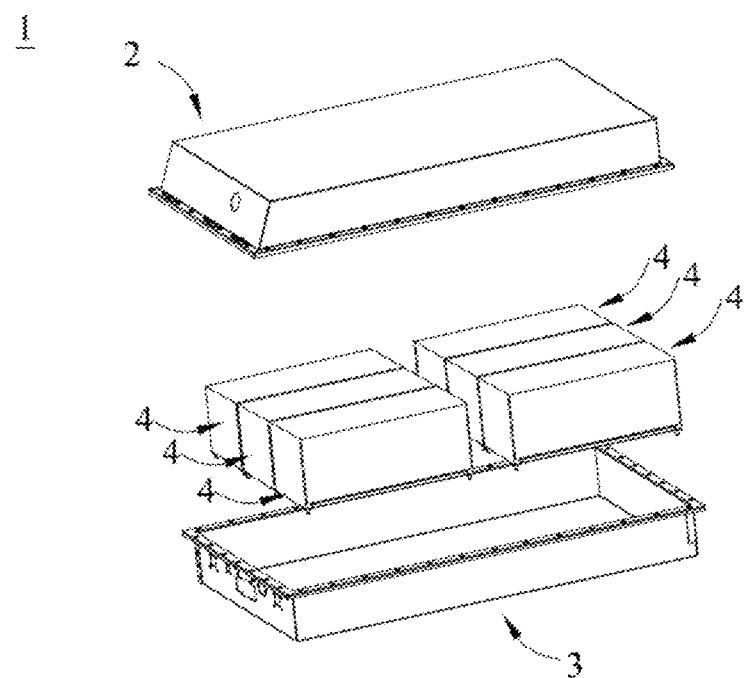
FIG. 4 is an exploded view of FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

[Apparatus]

The third aspect of the present application provides an apparatus, comprising the secondary battery according to the second aspect of the present application. Since the apparatus of the present application uses the secondary battery of the present application, the apparatus has at least the same advantages as the secondary battery.

The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack selected according to its usage requirements.

Figure 5:
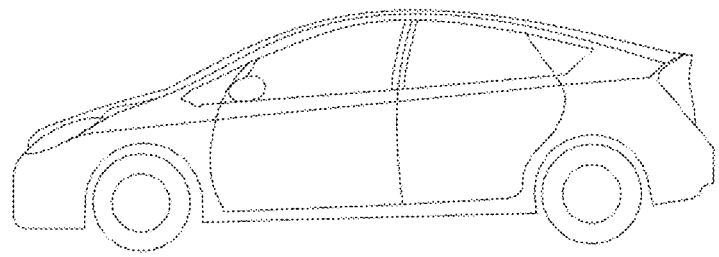
FIG. 5 is a schematic diagram of an apparatus provided by an embodiment of the present application.
Figure 6A:
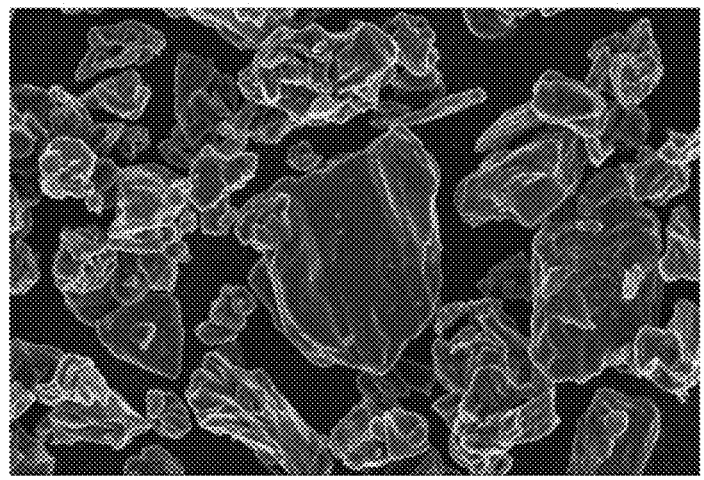
FIGS. 6a-6b are SEM (scanning electron microscope) images of composite graphite materials provided by an embodiment of the present application.
Figure 6B:
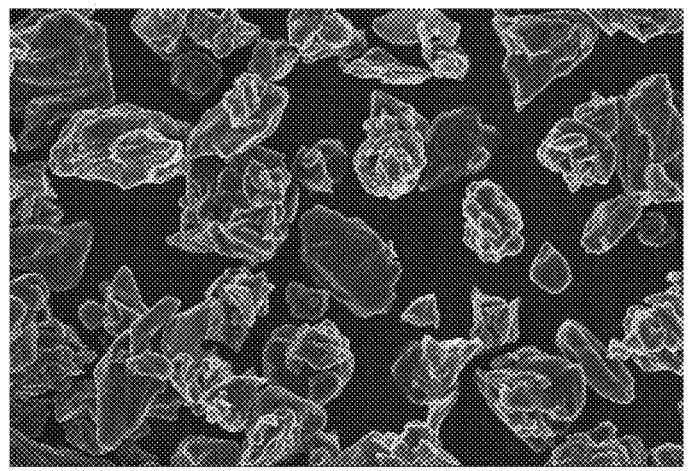
Figure 7:
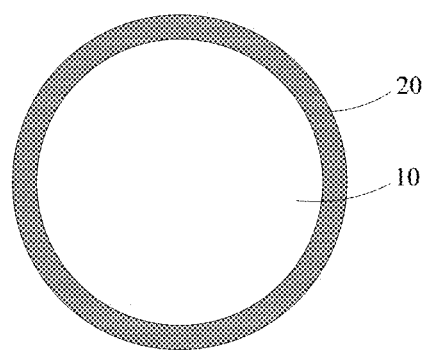
FIG. 7 is a schematic structural diagram of a composite graphite material provided by an embodiment of the present application.

FIG. 5 shows an apparatus as an example. The apparatus is a pure electric vehicle, a hybrid electric vehicle, or a plug-in hybrid electric vehicle. In order to meet the requirements of the apparatus for high power and high energy density of batteries, the battery pack or battery module can be used.

As another example, the apparatus may be a mobile phone, a tablet computer, a notebook computer, etc. The apparatus is generally required to be thin and light, and the secondary battery can be used as a power supply.

EXAMPLES

In order to describe the technical contents, structural features, achieved objectives and effects of the technical solutions in detail, the following detailed descriptions will be given in conjunction with specific embodiments. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Test Section (1) Gram Capacity

The prepared composite graphite material, the conductive agent Super P, the binder PVDF and the solvent NMP (N-methylpyrrolidone) were mixed uniformly at a mass ratio of 91.6:1.8:6.6 to form a slurry; the slurry was coated on a copper foil current collector, dried in an oven for later use. A lithium metal sheet was used as the counter electrode; Celgard separator was used as the separator; and EC+DMC+EMC (volume ratio 1:1:1) solution containing 1 mol/L $LiPF_6$ was used as electrolyte; they were assembled into CR2430-typde button battery in a glove box protected by argon. After standing for 12 hours, the battery was discharged at a constant current of 0.05 C to 0.005V, standing for 10 minutes, and then was discharged at a constant current of 50 μA to 0.005V, standing for 10 minutes, then was discharged at a constant current of 10 μA current to 0.005V; then the battery was charged at a constant current of 0.1 C to 2V, and the charge capacity was recorded. The ratio of the charging capacity to the mass of the composite graphite material is the gram capacity of the prepared composite graphite material.

(2) Kinetic Performance

At 25° C., the batteries prepared in the Examples and Comparative examples were fully charged at xC and fully discharged at 1 C for 10 times, then the battery was fully charged at xC, and then the negative electrode plate was disassembled and the lithium precipitation on the surface of the electrode plate was observed. If no lithium was precipitated on the surface of the negative electrode, the battery was tested with the charge rate×C in increments of 0.1 C until lithium was deposited on the surface of the negative electrode, and then the test was stopped. At this time, the charge rate (x−0.1) C was the maximum charge rate of the battery.

(3) Cycle Performance

At 25° C., the lithium-ion battery was charged with a constant current of 1 C to 4.3V, then charged at a constant voltage until the current was less than or equal to 0.05 C, and then discharged at a constant current of 1 C to 2.8V. This was a charge-discharge cycle. The discharge capacity at this time was the discharge capacity of the first cycle. The lithium ion battery was subjected to 1400 charge-discharge cycles according to the above method, the discharge capacity after the $1400^{th}$ cycle was recorded, and the capacity retention rate of the lithium ion battery after the $1400^{th}$ cycle at 1 C/1 C was calculated.

Capacity retention rate of lithium ion battery after the $1400^{th}$ cycle at 1 C/1 C (%)=discharge capacity of the $1400^{th}$ cycle/discharge capacity after the $1^{st}$ cycle×100%

(4) Cyclic Expansion Rate of Negative Electrode Plate

The thickness of the negative electrode plate after cold pressing was recorded as H0. The cold-pressed negative electrode plate, positive electrode plate, separator, and electrolyte were made into a secondary battery. At 25° C., the secondary battery was subjected to a 100% DOD (100% depth of discharge, that is to say, fully charged and then fully discharged) 1C/1C cycle in the NEWARE charger and discharge machine. A full charge and discharge cycle was recorded as one circle, and when the cycle reached 1400, the cycle stopped. Then the secondary battery was charged to 100% SOC (State of Charge), and disassembled, and then the thickness of the corresponding negative electrode plate was measured and denoted as $H_1$. The cyclic expansion rate of the negative electrode plate was: $(H_1/H_0-1)\times100\%$.

Test the other parameters of the composite graphite material according to the test method described above.

Example 1

Preparation of Artificial Graphite A

A non-needle green petroleum coke was used as raw material (volatile content was about 9.8%, sulfur content was about 0.5%), crushed, shaped to remove fine powder, pelletized under binder-free conditions, and then subjected to a graphitization treatment at 3100° C. to obtain artificial graphite A.

Preparation of Composite Graphite Materials

1) Dissolving polyacrylonitrile (PAN) in the solvent N-dimethylformamide to obtain a solution containing PAN;

2) Adding the artificial graphite A prepared above into the PAN-containing solution, and stirring until the mixture was uniform to obtain a slurry.

3) Transferring the slurry to a spray drying equipment through a peristaltic pump, and drying it in a nitrogen atmosphere at 190° C. to obtain a dry powder, wherein the rotation speed of the peristaltic pump was 20 rpm.

4) Subjecting the dry powder to a heat-treatment in a nitrogen atmosphere to obtain a composite graphite material.

Preparation of Negative Electrode Plate

The composite graphite material prepared above, the conductive agent Super P, the binder SBR, and the thickener CMC-Na were fully stirred and mixed at a mass ratio of 96.2:0.8:1.8:1.2 in an appropriate amount of deionized water to form a uniform negative electrode slurry; the negative electrode slurry was coated on the surface of the negative electrode current collector copper foil, dried and cold pressed to obtain a negative electrode plate. The compaction density of the negative electrode plate was 1.65 g/cm$^3$, and the areal density was 10.7 mg/cm$^2$.

Preparation of Positive Electrode Plate

The positive active material lithium nickel cobalt manganese oxide (LiNi$_{0.8}$Co$_{0.1}$Mn$_{0.1}$O$_2$), the conductive agent Super P, and the binder PVDF were fully stirred and mixed at a weight ratio of 96:2:2 in an appropriate amount of NMP to make the a uniform positive electrode slurry; the positive electrode slurry was coated on the surface of the positive electrode current collector aluminum foil, after drying and cold pressing, the positive electrode plate was obtained.

Preparation of Electrolyte

Ethylene carbonate (EC), ethyl methyl carbonate (EMC), and diethyl carbonate (DEC) were mixed at a volume ratio of 1:1:1, and then LiPF$_6$ was uniformly dissolved in the above solution to obtain an electrolyte. The concentration of LiPF$_6$ was 1 mol/L.

Separator

Polyethylene (PE) film was used as a separator.

Preparation of Secondary Battery

The positive electrode plate, the separator, and the negative electrode plate were stacked in order to obtain a battery core after winding; the battery core was put into the outer packaging, and the above-mentioned electrolyte was added, and after encapsulation, standing, formation, and aging, a secondary battery was obtained.

Examples 2-11 and Comparative Examples 1-6

The preparation method was similar to Example 1 with the exception that the preparation parameters of the composite graphite material were adjusted to obtain different composite graphite materials. The starting material PAN-co-Vac of the coating layer used in Example 11 was a copolymer of acrylonitrile and vinyl acetate. An uncoated artificial graphite A was used as the negative active material of Comparative Example 1 used.

Example 12

The preparation method was similar to Example 4 with the exception that the core material of the composite graphite material was artificial graphite B; the preparation method of artificial graphite B was as follows: needle-shape cooked petroleum coke was used as a raw material for crushing treatment; after shaping, the coke was granulated by using asphalt as the binder, wherein the amount of the asphalt was 8% of the total mass of the raw material; then, the graphitization process was performed at 2900° C. to obtain artificial graphite B.

Comparative Example 7

The preparation method was similar to that of Example 12 with the exception that an uncoated artificial graphite B was used as the negative active material.

TABLE 1

Related parameters and test results of Examples 1-12 and Comparative Examples 1-7

| | Types of raw materials for the coating | $m_G:m_P$ | Heat treatment temperature °C | time h | Absolute value of Zeta potential mV | weight loss rate % | $D_v50$ μm | $D_v10$ μm | $D_n10$ μm | SSA $m^2/g$ | Graphitization degree % | $I_D/I_G$ | $C_{004}/C_{110}$ | gram capacity of composite graphite material mAh/g | 1C/1C, 1400cycles expansion rate of electrode plate % | 1C/1C, 1400 cycles cyclic capacity retention rate % |
|---|---|---|---|---|---|---|---|---|---|---|---|---|---|---|---|---|
| Example 1 | PAN | 30:1 | 400 | 4 | 35.7 | 0.53 | 16.8 | 8.0 | 1.6 | 0.67 | 92.5 | 0.94 | 10.5 | 356.6 | 29.5 | 90.2 |
| Example 2 | PAN | 50:1 | 400 | 4 | 35.5 | 0.47 | 16.7 | 8.1 | 1.5 | 0.75 | 92.5 | 0.82 | 10.8 | 355.8 | 28.2 | 90.6 |
| Example 3 | PAN | 70:1 | 400 | 4 | 36.4 | 0.34 | 16.9 | 8.0 | 1.6 | 0.84 | 92.7 | 0.73 | 9.8 | 355.2 | 27.9 | 91.9 |
| Example 4 | PAN | 100:1 | 400 | 4 | 35.7 | 0.27 | 16.8 | 8.2 | 1.6 | 0.93 | 92.8 | 0.64 | 10.4 | 354.7 | 27.3 | 92.8 |
| Example 5 | PAN | 200:1 | 400 | 4 | 34.1 | 0.13 | 16.8 | 8.1 | 1.5 | 1.05 | 93.0 | 0.59 | 10.6 | 354.0 | 27.6 | 92.5 |
| Example 6 | PAN | 100:1 | 300 | 4 | 23.1 | 0.32 | 16.7 | 8.1 | 1.7 | 0.90 | 92.5 | 0.39 | 10.3 | 354.1 | 28.8 | 90.4 |
| Example 7 | PAN | 100:1 | 350 | 4 | 28.5 | 0.29 | 16.9 | 8.1 | 1.6 | 0.91 | 92.7 | 0.45 | 10.6 | 355.1 | 28.3 | 91.6 |
| Example 8 | PAN | 100:1 | 400 | 2 | 20.4 | 0.33 | 16.9 | 8.1 | 1.6 | 0.91 | 92.7 | 0.49 | 10.9 | 350.0 | 28.0 | 91.1 |
| Example 9 | PAN | 100:1 | 400 | 3 | 26.3 | 0.31 | 16.8 | 8.2 | 1.6 | 0.90 | 92.5 | 0.62 | 10.6 | 354.2 | 27.9 | 91.3 |
| Example 10 | PAN | 100:1 | 400 | 5 | 34.6 | 0.24 | 16.7 | 8.2 | 1.6 | 0.95 | 92.8 | 0.65 | 10.9 | 354.6 | 27.3 | 92.7 |
| Example 11 | PAN-co-Vac | 100:1 | 400 | 4 | 21.4 | 0.19 | 16.9 | 8.0 | 1.6 | 0.89 | 92.6 | 0.51 | 10.3 | 353.7 | 29.4 | 91.5 |
| Example 12 | PAN | 100:1 | 400 | 4 | 37.2 | 0.26 | 13.6 | 6.8 | 4.2 | 0.67 | 92.8 | 0.74 | 25.2 | 355.2 | 34.4 | 90.4 |
| Comparative Example 1 | / | / | / | / | 3.8 | 0 | 16.2 | 7.5 | 1.5 | 1.25 | 92.7 | 0.21 | 13.0 | 353.6 | 31.8 | 86.9 |
| Comparative Example 2 | PAN | 100:1 | 1000 | 4 | 15.2 | 0.005 | 16.8 | 8.0 | 1.6 | 0.95 | 92.6 | 0.39 | 12.9 | 352.1 | 30.7 | 87.5 |
| Comparative Example 3 | PAN | 100:1 | / | / | 2.9 | 0.97 | 16.9 | 8.1 | 1.6 | 0.83 | 92.6 | 0.23 | 13.1 | 352.0 | 32.5 | 86.7 |
| Comparative example 4 | PAN | 100:1 | 200 | 4 | 15.3 | 0.70 | 16.7 | 8.2 | 1.6 | 0.88 | 92.7 | 0.22 | 12.7 | 352.0 | 31.7 | 86.6 |
| Comparative Example 5 | PAN | 500:1 | 400 | 4 | 10.2 | 0.09 | 16.8 | 8.1 | 1.6 | 1.12 | 92.7 | 0.38 | 12.2 | 353.6 | 30.1 | 87.2 |
| Comparative Example 6 | asphalt | 100:1 | 1100 | 4 | 14.6 | 0.01 | 16.7 | 8.0 | 1.5 | 1.03 | 92.6 | 0.39 | 12.8 | 352.8 | 32.3 | 86.5 |
| Comparative Example 7 | / | / | / | / | 3.6 | 0 | 12.9 | 6.6 | 4.1 | 1.01 | 93.1 | 0.33 | 26.3 | 354.0 | 36.8 | 85.8 |

From the comparison of Examples 1 to 11 and Comparative Examples 1 to 6, and Example 12 to Comparative Example 7, it can be seen that the absolute value K of Zeta potential of the composite graphite material of the present application in deionized water with a pH of 7 was at least 20 mV, thus the dispersion uniformity and stability in the slurry was higher, and the contact with the binder was more comprehensive, so that the negative electrode plate using it can obtain higher cohesion and bonding force, thereby reducing the volume expansion of the negative electrode plate in the during the cycle. Therefore, the use of the composite graphite material improved the cycle performance of the battery. The composite graphite material also had a higher gram capacity and can improve the energy density of the battery In Comparative Examples 1-7, since the absolute value K of Zeta potential of the composite graphite material in deionized water with a pH of 7 was less than 20 mV, the negative electrode plate using it had a large rebound during the cycle, which made the cycle performance of the battery poor.

Examples 13-16

The preparation method was similar to that of Example 4, except that the $D_n10$ of the composite graphite material was adjusted and controlled.

Examples 17-20

The preparation method was similar to Example 4, except that the particle size of the composite graphite material was adjusted and controlled.

Example 21

The preparation method was similar to Example 4, except that: the binder of the negative electrode plate comprised copolymer A; the preparation method of copolymer A was as follows:

The first monomer A1, the second monomer B1 and the third monomer C2 were fed in a molar ratio of 75:10:15, and polymerization was carried out in the presence of the initiator azobisisobutylamidine hydrochloride; relative to 100 parts by weight of A1, B1 and C2, the amount of initiator used was 0.1 parts by weight. The polymerization temperature was 25° C.~35° C., the polymerization pressure was 101 kPa, and the polymerization time was 4 hours.

At the same time, the preparation method of the negative electrode plate was as follows:

The composite graphite material prepared in Example 4, the conductive agent Super P, the copolymer A, the binder SBR, and the thicker CMC-Na were fully mixed at a mass ratio of 97:0.5:1.2:0.7:0.6 in an appropriate amount of deionized water and stirred to form a uniform negative electrode slurry; the negative electrode slurry was coated on the surface of the negative electrode current collector copper foil. After drying and cold pressing, a negative electrode plate was obtained. The compaction density of the negative electrode plate was 1.65 g/cm$^3$, and the areal density is 10.7 mg/cm$^2$.

TABLE 2

Related parameters and test results of Examples 13-16

| | Absolute value of Zeta potential mV | weight loss rate % | $D_v50$ μm | $D_v10$ μm | $D_n10$ μm | SSA m$^2$/g | Graphitization degree % | $I_D/I_G$ | $C_{004}/C_{110}$ | gram capacity of composite graphite material mAh/g | 1C/1C, 1400cycles cyclic expansion rate of electrode plate % | 1C/1C, 1400cycles capacity retention rate % |
|---|---|---|---|---|---|---|---|---|---|---|---|---|
| Example 13 | 35.7 | 0.26 | 16.8 | 8.0 | 0.8 | 0.97 | 92.4 | 0.61 | 10.9 | 353.4 | 28.1 | 92.0 |
| Example 14 | 35.5 | 0.28 | 16.9 | 7.9 | 1.5 | 0.94 | 92.3 | 0.62 | 10.7 | 354.2 | 27.5 | 92.5 |
| Example 15 | 35.8 | 0.25 | 16.9 | 8.1 | 2.5 | 0.89 | 92.5 | 0.63 | 10.4 | 355.1 | 27.1 | 92.9 |
| Example 16 | 35.6 | 0.27 | 16.8 | 8.0 | 3.0 | 0.84 | 92.4 | 0.62 | 10.2 | 356.2 | 26.6 | 93.1 |

TABLE 3

Related parameters and test results of Examples 17-20

| | Absolute value of Zeta potential mV | weight loss rate % | $D_v50$ μm | $D_v10$ μm | $D_n10$ μm | SSA m$^2$/g | Graphitization degree % | $I_D/I_G$ | $C_{004}/C_{110}$ | gram capacity of composite graphite material mAh/g | 1C/1C, 1400cycles cyclic expansion rate of electrode plate % | 1C/1C, 1400cycles capacity retention rate % | Kinetic performance |
|---|---|---|---|---|---|---|---|---|---|---|---|---|---|
| Example 17 | 35.6 | 0.27 | 12.5 | 6.8 | 1.6 | 0.97 | 92.3 | 0.62 | 10.7 | 353.0 | 27.4 | 92.4 | 1.8 C |
| Example 18 | 35.7 | 0.28 | 16.2 | 7.5 | 1.6 | 0.93 | 92.5 | 0.64 | 10.9 | 354.3 | 27.5 | 92.5 | 1.7 C |
| Example 19 | 35.5 | 0.26 | 17.8 | 8.1 | 1.6 | 0.84 | 92.4 | 0.63 | 10.8 | 355.4 | 27.6 | 92.3 | 1.6 C |
| Example 20 | 35.8 | 0.27 | 18.5 | 8.6 | 1.6 | 0.79 | 92.6 | 0.61 | 10.6 | 356.9 | 27.6 | 92.4 | 1.5 C |

TABLE 4

Related parameters and test results of Example 21

| | Absolute value of Zeta potential mV | weight loss rate % | $D_v50$ μm | $D_v10$ μm | $D_n10$ μm | SSA m$^2$/g | Graphitization degree % | $I_D/I_G$ | $C_{004}/C_{110}$ | 1C/1C, 1400cycles cyclic expansion rate of electrode plate % | 1C/1C, 1400cycles capacity retention rate % |
|---|---|---|---|---|---|---|---|---|---|---|---|
| Example 21 | 35.7 | 0.27 | 16.2 | 8.2 | 1.6 | 0.93 | 92.8 | 0.64 | 10.4 | 25.6 | 92.7 |

From the results of Example 4 and Examples 13-16, it can be seen that when the $D_n10$ of the composite graphite material still was in an appropriate range, the battery can have a lower cyclic expansion and a higher cyclic capacity retention rate, further improving the gram capacity of the composite graphite material.

From the results of Example 4 and Examples 17-20, it can be seen that when the particle size distribution of the composite graphite material was within an appropriate range, the composite graphite material can have both high gram capacity and cycle capacity retention rate, lower cyclic expansion and better kinetic performance.

It can be seen from the results of Example 4 and Example 21 that when the binder of the negative electrode plate comprised copolymer A, the cyclic expansion of the electrode plate and the battery can be further reduced.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A composite graphite material, comprising a core material and a coating layer coating at least a part of the surface of the core material, the core material comprising graphite,
    wherein the composite graphite material has an absolute value K of Zeta potential of at least 20 mV, in deionized water with a pH of 7;
    wherein the composite graphite material has a D peak intensity $I_D$ and a G peak intensity $I_G$, and the ratio $I_D/I_G$ is from 0.4 to 1.0.

2. The composite graphite material according to claim 1, wherein the absolute value K of zeta potential of the composite graphite material in deionized water with a pH of 7 is K ≥ 25 mV.

3. The composite graphite material according to claim 1, wherein the coating layer comprises a coating material containing a nitrogen-containing heterocyclic moiety, and at least a part of the nitrogen-containing heterocyclic moiety contains a carbon-nitrogen double bond.

4. The composite graphite material according to claim 3, wherein the nitrogen-containing heterocyclic moiety comprises a fused aza-heterocyclic moiety;
wherein the fused aza-heterocyclic moiety comprises one or more of Formula 1 to Formula 3:

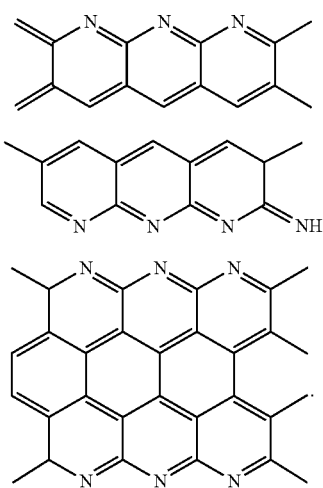

Formula 1

Formula 2

Formula 3

5. The composite graphite material according to claim 3, wherein when the temperature raises from 40° C. to 800° C., the composite graphite material has a weight loss rate in an inert non-oxidizing gas atmosphere of 0.1% to 0.55%.

6. The composite graphite material according to claim 1, wherein the core material is an artificial graphite.

7. The composite graphite material according to claim 6, wherein the composite graphite material satisfies: when the composite graphite material is in a electrode plate with a compaction density of 1.6 g/cm³ to 1.7 g/cm³, the ratio of the peak area $C_{004}$ of 004 crystal plane to the peak area $C_{110}$ of 110 crystal plane of the composite graphite material satisfies: $C_{004}/C_{110} \leq 15$.

8. The composite graphite material according to claim 6, wherein the composite graphite material has a graphitization degree of 90% to 95%.

9. The composite graphite material according to claim 6, wherein the composite graphite material also satisfies one or more of the following (1) to (7):
(1) the composite graphite material has a Dv50 of 15 μm to 20 μm;
(2) the composite graphite material has a $D_v10$ of at least 6 μm;
(3) the composite graphite material has a Dn10 of 1.0 μm to 3.0 μm;
(4) the composite graphite material has a specific surface area SSA of 0.5 m²/g to 1.3 m²/g;
(5) the composite graphite material has a compacted powder density under a pressure of 5 tons of 1.80 g/cm³ to 2.10 g/cm³;
(6) the composite graphite material has a tap density of 0.8 g/cm³ to 1.15 g/cm³;
(7) the composite graphite material has a gram capacity of 350 mAh/g to 359 mAh/g.

10. A secondary battery comprising a negative electrode plate which comprises a negative active material, wherein the negative active material comprises the composite graphite material according to claim 1.

11. The secondary battery according to claim 10, wherein the negative electrode plate further comprises a binder including a copolymer, and the copolymer comprises at least a first monomer unit represented by Formula (I), a second monomer unit represented by Formula (II) and a third monomer unit represented by Formula (III),

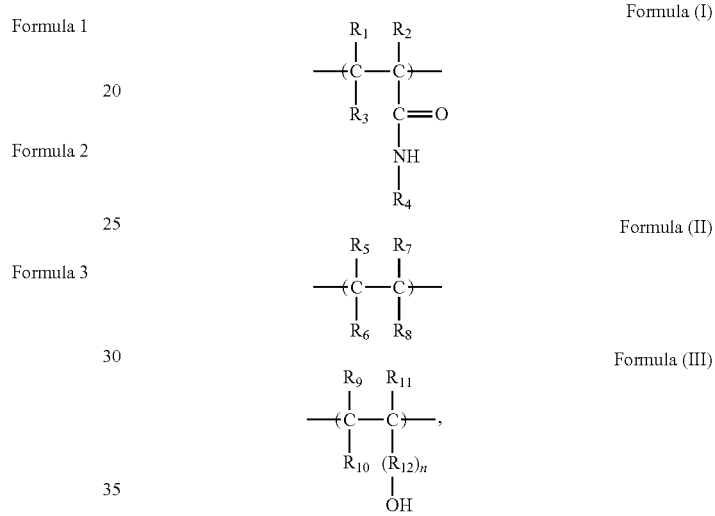

Formula (I)

Formula (II)

Formula (III)

wherein $R_1$, $R_2$, $R_3$, $R_5$, $R_6$, $R_7$, $R_9$, $R_{10}$, and $R_{11}$ are each independently selected from hydrogen, a linear or branched alkyl group having 1 to 8 carbon atoms,
$R_4$ is selected from hydrogen, a substituted or unsubstituted alkyl group having 1 to 8 carbon atoms,
$R_8$ is selected from —COOM, sulfonate phenyl, and sodium sulfonate phenyl, and M is selected from H, and positive monovalent alkali metal ion,
$R_{12}$ is selected from a substituted or unsubstituted alkyl group having 1 to 8 carbon atoms, and n is 0 or 1.

12. The secondary battery according to claim 11, wherein, based on the total moles of the first monomer unit, the second monomer unit, and the third monomer unit, the first monomer unit is present in an amount of at least 40 mol %; and/or,
based on the total moles of the first monomer unit, the second monomer unit and the third monomer unit, the second monomer unit is present in an amount of at most 29.5 mol %; and/or,
based on the total moles of the first monomer unit, the second monomer unit and the third monomer unit, the third monomer unit is present in an amount of at most 30.5 mol %.

13. An apparatus comprising the secondary battery according to claim 10.

14. A method for preparing the composite graphite material according to claim 1, comprising the step of coating at least a part of the surface of a core material comprising graphite with a coating material to obtain a composite graphite material.

15. The method according to claim 14, wherein the step of coating at least a part of the surface of the core material with the coating material to obtain the composite graphite material comprises:
(1) mixing a solution containing a nitrogen-containing heterocyclizable polymer with a core material so that the polymer coats at least a part of the surface of the core material to obtain a slurry, wherein the core material comprises graphite, and a mass ratio of the core material to the polymer is $m_G:m_P \leq 400:1$;
(2) drying the slurry to obtain a staring material comprising a core material and a polymer layer coating at least a part of the surface of the core material;
(3) subjecting the starting material to heat treatment at a temperature of 300° C. to 400° C. for a heat treatment time of at least 2 hours, so that the polymer is heterocyclized to obtain a coating material with a fused aza-heterocyclic moiety, and at least part of the nitrogen-containing heterocycle in the fused aza-heterocyclic moiety has a carbon-nitrogen double bonds to obtain a composite graphite material.

16. The method according to claim 15, wherein a mass ratio $m_G$:mp of the core material to the polymer is from 30:1 to 400:1.

17. The method according to claim 15, wherein the polymer comprises one or more of polyacrylonitrile or copolymers thereof.

18. The method according to claim 15, wherein the polymer has a number average molecular weight of 50,000 to 150,000.

19. The method according to claim 15, wherein, in the step (3),
the heat treatment of the starting material is performed at a temperature of 350° C. to 400° C.; and/or,
the heat treatment time is from 2 hours to 6 hours.

* * * * *